United States Patent
Hiromori et al.

(10) Patent No.: US 6,400,614 B1
(45) Date of Patent: Jun. 4, 2002

(54) TRANSMISSION DEVICE AND INTEGRATED CIRCUIT

(75) Inventors: Masaki Hiromori; Seiji Matsuzaki; Toshiaki Asai; Yoshinari Oshio; Masato Hashizume; Megumi Shibata, all of Osaka; Yuji Kamura, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/903,004

(22) Filed: Jul. 11, 2001

(30) Foreign Application Priority Data

Mar. 16, 2001  (JP) ........................................ 2001-076761

(51) Int. Cl.⁷ ................................................ G11C 7/00
(52) U.S. Cl. ................... 365/189.01; 365/219; 365/221
(58) Field of Search ...................... 365/189.01, 189.07, 365/198, 219, 220, 221, 233.5, 239, 236

(56) References Cited

U.S. PATENT DOCUMENTS

| | | | | |
|---|---|---|---|---|
| 5,046,051 A | * | 9/1991 | Doornhein et al. | ......... 365/221 |
| 5,101,283 A | * | 3/1992 | Seki et al. | ................... 358/298 |
| 5,422,858 A | * | 6/1995 | Mizukami et al. | ........... 365/239 |
| 6,307,868 B1 | * | 10/2001 | Rakib et al. | ................. 370/485 |

FOREIGN PATENT DOCUMENTS

JP    11112456    4/1999

* cited by examiner

Primary Examiner—David Nelms
Assistant Examiner—Gene N. Auduong
(74) Attorney, Agent, or Firm—Katten Muchin Zavis Rosenman

(57) ABSTRACT

A transmission device and an integrated circuit improved in quality and reliability of digital transmission control. A memory stores an input signal, write address generating means generates a write address for writing in the memory, and read address generating means generates a read address for reading from the memory. Phase state monitoring means monitors a transition from a steady phase state in which writing/reading in/from the memory is normally performed or from a startup state to a coincident phase state in which address values of the write and read addresses coincide with each other or to an unstable phase state in which a phase fluctuation margin is one-sided. When the coincident phase state or the unstable phase state is detected, reset signal output means outputs a reset signal to the write and read address generating means such that the phase relation between the write and read addresses is brought to an optimum phase relation.

6 Claims, 13 Drawing Sheets

TRANSMISSION DEVICE AND INTEGRATED CIRCUIT

BACKGROUND OF THE INVENTION (1) Field of the Invention

The present invention relates to a transmission device and an integrated circuit, and more particularly, to a transmission device for controlling transmission of digital signals and an integrated circuit having a signal rate conversion function built therein and packaged on a semiconductor substrate.

(2) Description of the Related Art

With the recent advance of computer technology and optical fiber technology, synchronous multiplexed networks that provide advanced communication services, such as high-speed computer communications and multimedia communications, have come to be widely used.

Multiplexing techniques used in constructing synchronous multiplexed networks include SDH/SONET transmission system as a core technique. SDH/SONET, which prescribes an interface for effectively multiplexing various high-speed services or existing low-speed services, has been standardized and is still being developed.

Meanwhile, transmission systems of this type are required to have a large-scale multiplexing capability because of an increasing capacity of channels to be handled, and thus their functions are divided into a plurality of LSIs. Such LSIs, which are arranged in multiple stages according to their function, perform P/S (Parallel/Serial) conversion at individual output stages and process signals with the interface speed gradually increased.

FIG. 10 shows the configuration of a conventional P/S LSI. The P/S LSI 20 comprises a PLL (Phase Locked Loop) section 21 and a P/S section 22. The PLL section 21 is constituted by a phase comparator 21a, a PLL 21b including a VCXO (voltage controlled crystal oscillator) 21b-1, and a frequency divider 21c.

A clock driver 30 outputs a clock signal ck1, and an LSI 40 outputs n-parallel data D1 which has been processed using a delayed clock signal ck1.

The PLL section 21, which uses the clock signal ck1 as a reference clock signal, constantly performs feedback control on a clock signal ck1b, of which the frequency is 1/n of that of a clock signal ck2 output by the PLL section 21, with reference to the clock signal ck1 so that the clock signal ck1b may keep time with the clock signal ck1.

The phase comparator 21a compares the phases of frequencies of the clock signals ck1 and ck2 with each other and outputs a phase difference. The PLL 21b converts the phase difference to a direct-current voltage and outputs the resulting voltage to the VCXO 21b-1 provided therein, and the VCXO 21b-1 generates an output frequency proportional to the direct-current voltage. The frequency divider 21c supplies the phase comparator 21a with a frequency-divided signal (clock signal ck1b=clock signal ck2/n) obtained by dividing the frequency of the clock signal ck2 by n. Thus, in the PLL section 21, the VCXO 21b-1 is controlled so that the frequency-divided signal may be in phase with the clock signal ck1.

The P/S section 22 uses the clock signal ck1b as a write clock signal to write the low-speed n-parallel data D1, and uses the clock signal ck2 as a read clock signal to serially read out the written data, thereby outputting serial data D2 at an increased interface speed.

In the P/S LSI 20 described above, it is necessary that the phase relation between the low-speed clock signal ck1 and the clock signal ck2 output by the PLL section 21 should be determined beforehand, in order to reduce a steady-state phase error, and also that the low-speed data D1 should be input in accordance with the predetermined phase relation.

Accordingly, at the stage of design, the output phase of the LSI 40 must be matched with the fetch phase of the P/S LSI 20, or an additional component must be mounted to the unit for the purpose of adjustment. This makes the circuit configuration specific to the unit used, so that the flexibility is lost and also that a heavy burden is imposed on design and development.

On the other hand, P/S LSI products have recently come to be available which include a FIFO (First-In, First-Out) circuit for the purpose of relaxing the regulations on phases. FIG. 11 shows the configuration of a conventional P/S LSI including a FIFO circuit.

The P/S LSI 20a includes a FIFO circuit 210, in addition to the aforementioned PLL section 21 and P/S section 22. The FIFO circuit 210 comprises an elastic store memory 211, a write counter 212, a read counter 213, and a phase monitoring section 214.

A clock driver 30 outputs a clock signal ck1, and an LSI 40 outputs n-parallel data D1 processed using the clock signal ck1, as well as a clock signal ck1a obtained by delaying the clock signal ck1.

Based on the clock signal ck1a, the write counter 212 generates a write address for writing the data D1 in the elastic store memory 211. Based on the clock signal ck1b, the read counter 213 generates a read address for reading out the data D1 written in the elastic store memory 211.

The elastic store memory 211 has a depth of m (m memory stages) and, in response to the clock signal ck1a, writes the data D1 in the corresponding write address. Also, in response to the clock signal ck1b from the PLL section 21, the elastic store memory reads out the data D1 from the read address.

Using the clock signal ck1b, the phase monitoring section 214 monitors the phases of the write and read addresses. If the write and read addresses are in such a phase relation that the write and read operations cannot be normally performed, the phase monitoring section sends a reset signal SET to the write and read counters 212 and 213, to reset the phase relation.

The P/S section 22 uses the clock signal ck1b from the PLL section 21 as a write clock signal to write the n-parallel data D1 output from the FIFO circuit 210, and uses the clock signal ck2 as a read clock signal to serially read out the written data, thereby outputting serial data D2.

With the P/S LSI 20a including the FIFO circuit 210, the regulations on the fetch phase of low-speed data can be relaxed. Accordingly, the use of such flexible LSI makes it unnecessary to establish regulations on the phases within the device at an initial stage of development, and also lightens the burden on design and development.

However, the conventional P/S LSI 20a described above is constructed such that the resetting is carried out only when the values of the write and read addresses are in exact coincidence. Thus, while the values of the write and read addresses are very close to each other and about to coincide, the operation is judged to be in a normal state and no resetting Is performed, giving rise to a problem that the operation is continued in an unstable state.

FIG. 12 is a time chart showing the resetting operation performed by the P/S LSI 20a, wherein it is assumed that the number n of parallel data is "4" (n=4) and that the depth m of the elastic store memory 211 is "7" (m=7). Data is written in the write address WA at the leading edge of each clock pulse ck1$a$, and data is read out from the read address RA at the leading edge of each clock pulse ck1$b$. The resetting is performed when the reset signal SET turns to "H", and upon resetting, the phases of the write and read addresses are reset to be in an optimum phase relation.

First, at the startup, the values of the write and read addresses WA and RA are set at optimum positions (WA=1, RA=4) by the reset signal SET.

If the clock signal ck1$a$ is perturbed due to an external factor, such as ESD (electrostatic discharge), within an interval A and the values of WA and RA become coincident with each other, the WA and RA values are reset to their original optimum positions by the reset signal SET (in this case, although a read error occurs in the elastic store memory 211, it is not treated as a target of normal evaluation because the erroneous operation was caused by an external factor, such as ESD, which is outside the coverage of guarantee).

FIG. 13 is a time chart illustrating a problematic operation of the P/S LSI 20$a$. At the startup, the values of the write and read addresses WA and RA for the elastic store memory 211 are set at optimum positions (WA=1, RA=4) by the reset signal SET, as in the case of FIG. 12.

Let it be assumed that in an interval B, the clock signal ck1$a$ is perturbed due to an external factor such as ESD, causing the phase relation to change to an extent such that the values of WA and RA are very close to each other and about to coincide. In such a situation, no resetting is performed, so that the operation is continued in an unstable state near slip.

While the operation is thus continued in an unstable state, the phase relation between the clock signals ck1$a$ and ck1$b$ can possibly be changed (in the illustrated example, the clock signal ck1$a$ is displaced backward with respect to the clock signal ck1$b$) due to factors such as fluctuations in temperature or power supply (these factors are very probable even in normal operating conditions and the operation needs to maintain normality within the coverage of guarantee) such that the values of WA and RA exactly coincide with each other. If this occurs, the resetting takes place even though the device is operating in normal operating conditions.

Thus, with the conventional P/S LSI 20$a$, if the operation shifts to an unstable state due to an external factor such as ESD which is outside the coverage of guarantee, without the resetting being performed, and if the operation in such an unstable state undergoes a further change due to a factor such as fluctuations in temperature or power supply, the resetting takes place even though the device is operating in normal operating conditions, thus lowering the quality and reliability of the device.

SUMMARY OF THE INVENTION

The present invention was created in view of the above circumstances, and an object thereof is to provide a transmission device which is improved in the quality and reliability of digital transmission control.

Another object of the present invention is to provide an integrated circuit which is improved in the quality and reliability of digital transmission control.

To achieve the first object, there is provided a transmission device for controlling transmission of digital signals. The transmission device comprises a memory for storing an input signal, write address generating means for generating a write address for writing in the memory, read address generating means for generating a read address for reading from the memory, phase state monitoring means for monitoring a transition from a steady phase state in which writing/reading in/from the memory is normally performed or from a startup state to a coincident phase state in which address values of the write and read addresses coincide with each other or to an unstable phase state in which a phase fluctuation margin is one-sided, and reset signal output means, responsive to detection of the coincident phase state or the unstable phase state, for outputting a reset signal to the write address generating means and the read address generating means such that a phase relation between the write and read addresses is brought to an optimum phase relation.

Also, to achieve the second object, there is provided an integrated circuit having a signal rate conversion function built therein and packaged on a semiconductor substrate. The integrated circuit comprises a PLL circuit for generating an output clock signal by multiplying an input clock signal, which is synchronized with an n-parallel signal, by n while keeping time with the input clock signal, a FIFO circuit including a memory for storing the parallel signal, write address generating means for generating a write address for writing in the memory, read address generating means for generating a read address for reading from the memory, phase state monitoring means for monitoring a transition from a steady phase state in which writing/reading in/from the memory is normally performed or from a startup state to a coincident phase state in which address values of the write and read addresses coincide with each other or to an unstable phase state in which a phase fluctuation margin is one-sided, and reset signal output means, responsive to detection of the coincident phase state or the unstable phase state, for outputting a reset signal to the write address generating means and the read address generating means such that a phase relation between the write and read addresses is brought to an optimum phase relation, and a P/S circuit for converting the parallel signal read out from the memory to a serial signal in response to the output clock signal.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
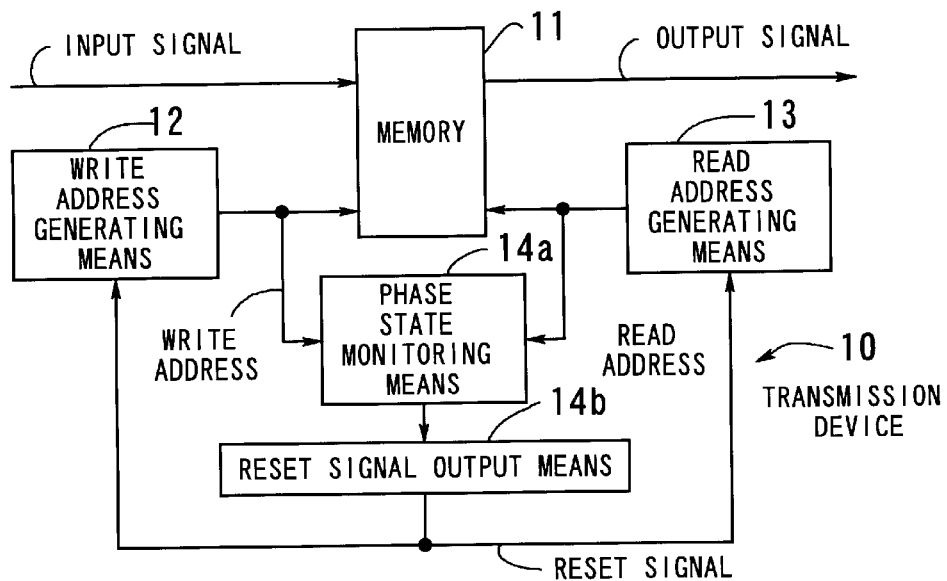
FIG. 1 is a diagram illustrating the principle of a transmission device according to the present invention.
Figure 1:
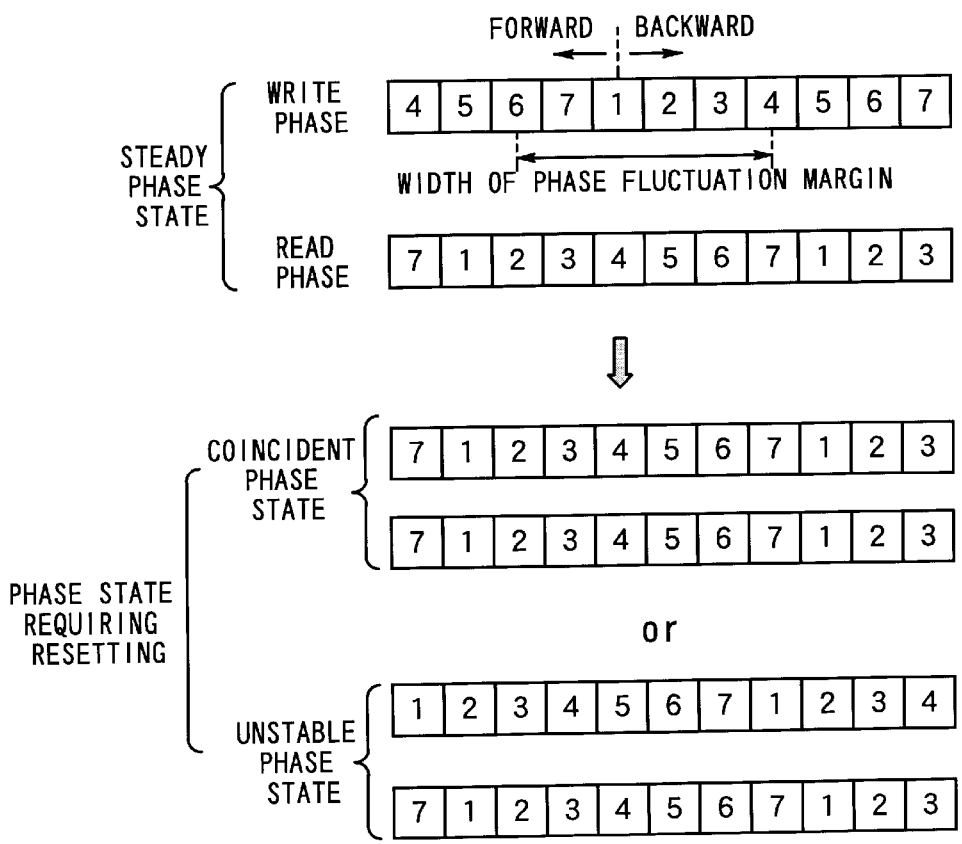

Embodiments of the present invention will be hereinafter described with reference to the drawings. FIG. 1 illustrates the principle of a transmission device according to the present invention. The transmission device 10 controls the transmission of digital signals.

A memory 11 stores an input signal, and the stored signal is read out therefrom as an output signal. Write address generating means 12 generates a write address for writing the signal in the memory 11, and read address generating means 13 generates a read address for reading out the signal from the memory 11.

Phase state monitoring means 14a monitors a phase state of the write and read addresses for writing/reading in/from the memory 11, to detect a transition from a steady phase state in which the writing/reading is normally performed or from a startup state to a coincident phase state or an unstable phase state as a phase state in which the writing/reading cannot be normally performed due to a certain factor.

The coincident phase state represents a state of phase timing in which address values of both the write and read addresses coincide with each other. The unstable phase state represents a state of phase timing in which a phase fluctuation margin is one-sided, forward or backward.

Figure 4:
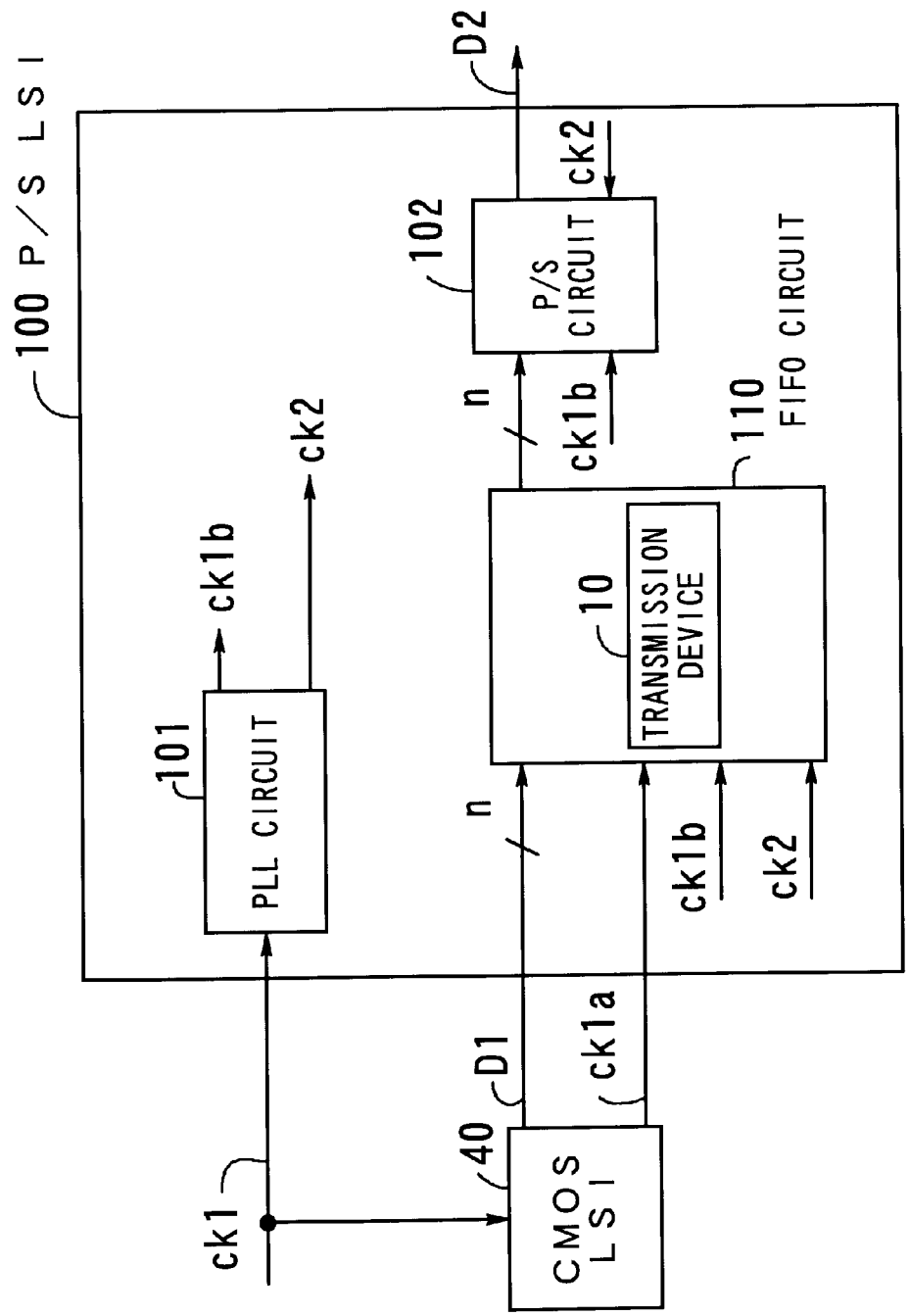
FIG. 4 is a diagram showing the configuration of an integrated circuit.

Specifically, to detect the unstable phase state, a first phase state in which the consecutive count of an address value has become outside a set range or a second phase state in which a skip of address value count has occurred may be detected as the unstable phase state, as described in detail later with reference to FIG. 4 and the following figures.

When the coincident phase state or the unstable phase state has been detected by the phase state monitoring means 14a, reset signal output means 14b outputs a reset signal to the write address generating means 12 and the read address generating means 13.

On receiving the reset signal, the write address generating means 12 and the read address generating means 13 reset the phase relation between the write and read addresses to an optimum phase relation (original steady phase state).

As shown in FIG. 1, for example, in the steady phase state, the phase fluctuation margin of the write phase relative to the read phase extends on both forward and backward sides to approximately the same degree with respect to the phase relation between the write and read addresses.

If a transition occurs from the steady phase state to the coincident phase state in which the address values of the write and read addresses coincide with each other or to the unstable phase state in which the phase fluctuation margin is one-sided (in FIG. 1, the phase fluctuation margin is one-sided to the forward side, leaving no margin on the backward side), the write address generating means 12 and the read address generating means 13 are reset to resume the steady phase state. Then, the write/read control is again performed.

Figure 2:
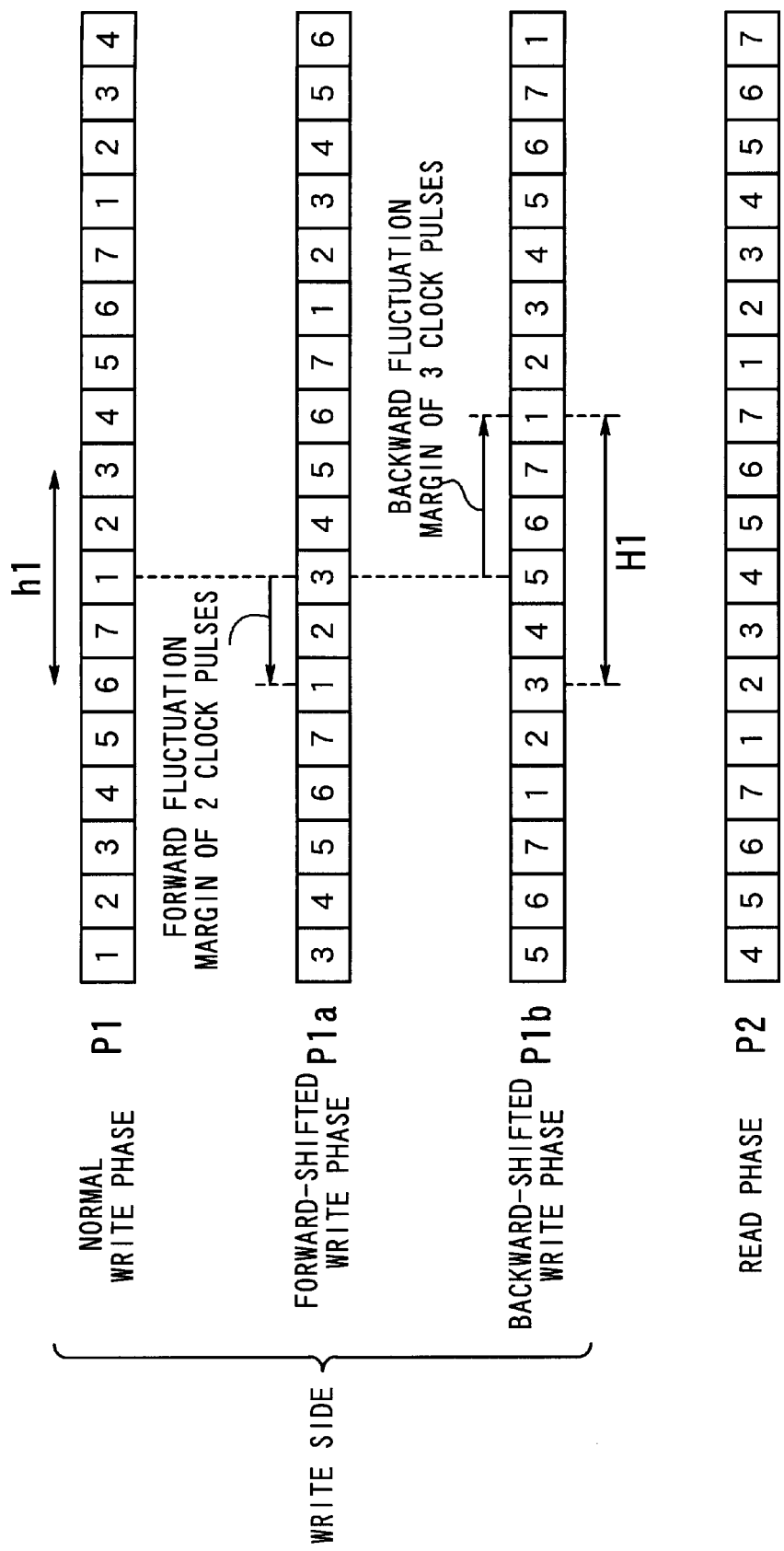
FIG. 2 is a diagram exemplifying normal operation.

The problem to be solved by the present invention will be now explained in more detail. FIG. 2 exemplifies normal operation. The phase relation between a normal write phase P1 of the write side and a read phase P2 represents the steady phase state in which the writing/reading can be performed with respect to the memory 11 (for example, when data is written in a write address "1", data is read from a read address "4").

Let us consider a case where the phase has shifted forward or backward from this state due to a factor such as fluctuations in temperature or power supply. Where the write phase P1 shifts forward by two clock pulses and becomes a write phase P1a, the write phase does not coincide with the read phase P2 (a forward shift by two clock pulses is within an allowable range).

Also, where the write phase P1 shifts backward by three clock pulses and becomes a write phase P1b, the write phase does not coincide with the read phase P2 (a backward shift by three clock pulses is within the allowable range).

Thus, shifting of the write phase relative to the read phase is allowed unless a range H1 is exceeded. Accordingly, as long as the output fluctuation width of the input signal to the memory 11 remains in the vicinity of the center (in the figure, range h1) of the allowable range H1, the phase state is regarded as the steady phase state and the write/read control is performed normally, so that no read error occurs.

Figure 3:
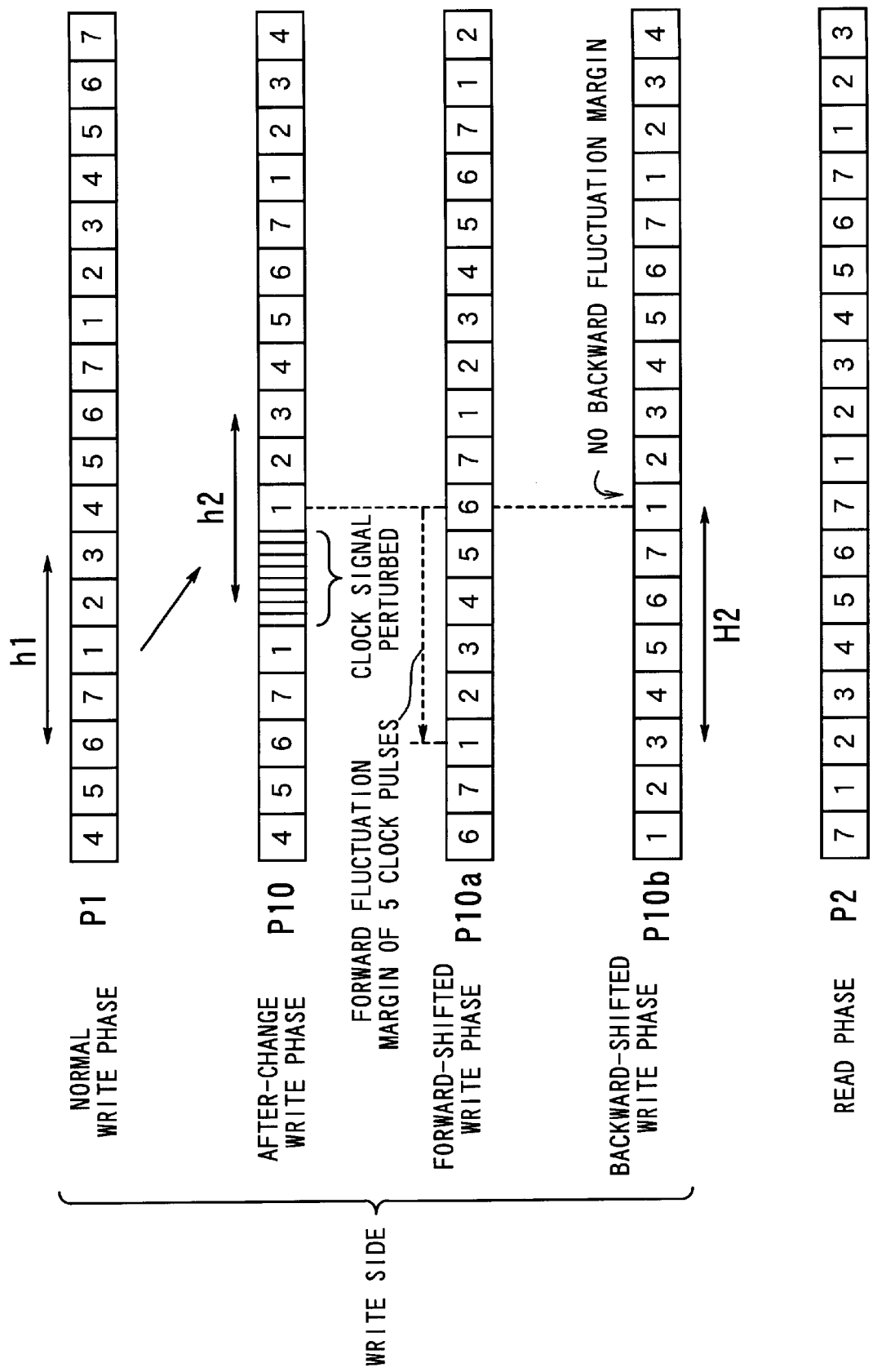
FIG. 3 is a diagram exemplifying problematic operation.

FIG. 3 exemplifies problematic operation. In the figure, the phase relation between the normal write phase P1 of the write side and the read phase P2 represents the steady phase state in which the writing/reading can be performed with respect to the memory 11.

It is assumed that the write phase P1 has undergone perturbation of the clock signal at the position indicated in the figure, due to an external factor such as ESD, and becomes an after-change write phase P10. At this point of time, the write phase P10 is not coincident with the read phase P2, and the output fluctuation width of the input signal shifts to h2.

Let us consider a case where the phase has shifted forward or backward from this state due to a factor such as fluctuations in temperature or power supply. Where the write phase P10 shifts forward by five clock pulses and becomes a write phase P10a, the write phase does not coincide with the read phase P2. However, the write phase P10a has no backward fluctuation margin at all, and coincides with the read phase P2 if only it is shifted backward by one clock pulse.

Thus, although fluctuation of the write phase relative to the read phase is allowed within a range of H2, the output fluctuation width of the input signal has shifted to h2; therefore, if the write phase shifts backward, a read error occurs instantly.

Specifically, if the operation becomes unstable (e.g., write phase P10) due to an external factor outside the coverage of guarantee, such as ESD, to an extent such that no resetting operation is performed (the address values do not become coincident), and if such an unstable operation is continued, phase fluctuation caused by a factor such as fluctuations in temperature or power supply, that the device should originally absorb, cannot be coped with, since there is no sufficient fluctuation margin on the forward or backward side (in FIG. 3, a phase state occurs in which the fluctuation margin is one-sided such that there is a forward fluctuation margin of five clock pulses but no backward fluctuation margin), thus giving rise to a problem that the resetting is performed even though the device is operating in normal operating conditions.

Conventionally, the resetting is carried out only when a transition from the steady phase state to the coincident phase state in which the address values coincide with each other has occurred due to a shift of phase timing. According to the present invention, the resetting is performed not only when the phase state has shifted to the coincident phase state but also when the phase state has shifted to the unstable phase state in which the fluctuation margin is one-sided.

An integrated circuit to which the transmission device 10 of the present invention is applied will be now described. FIG. 4 shows the configuration of such an integrated circuit. The integrated circuit 100 is an LSI circuit having a signal rate conversion function built therein and packaged on a semiconductor substrate, and is hereinafter referred to as P/S LSI 100.

Figure 10:
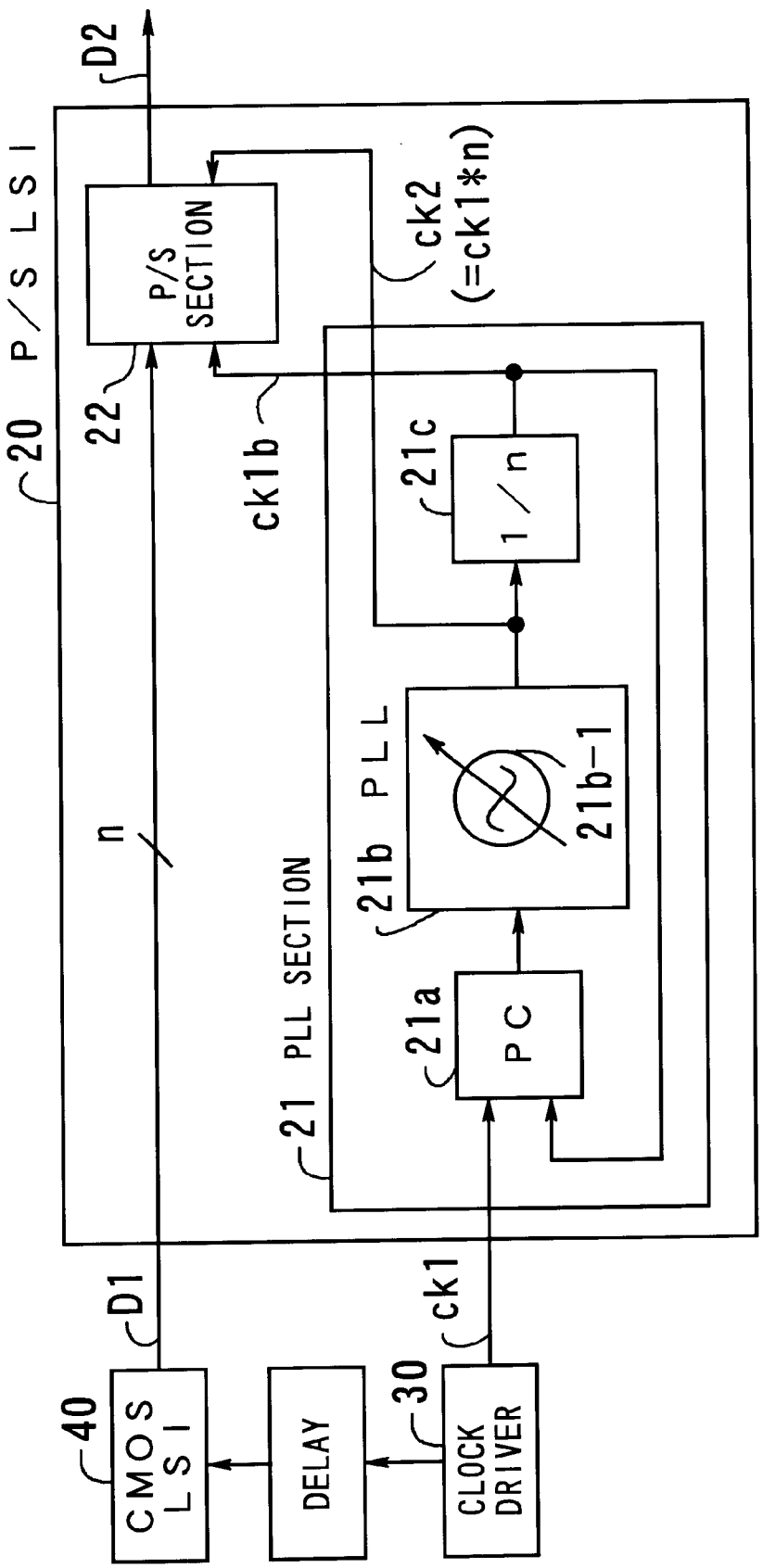
FIG. 10 is a diagram showing the configuration of a conventional P/S LSI.
Figure 11:
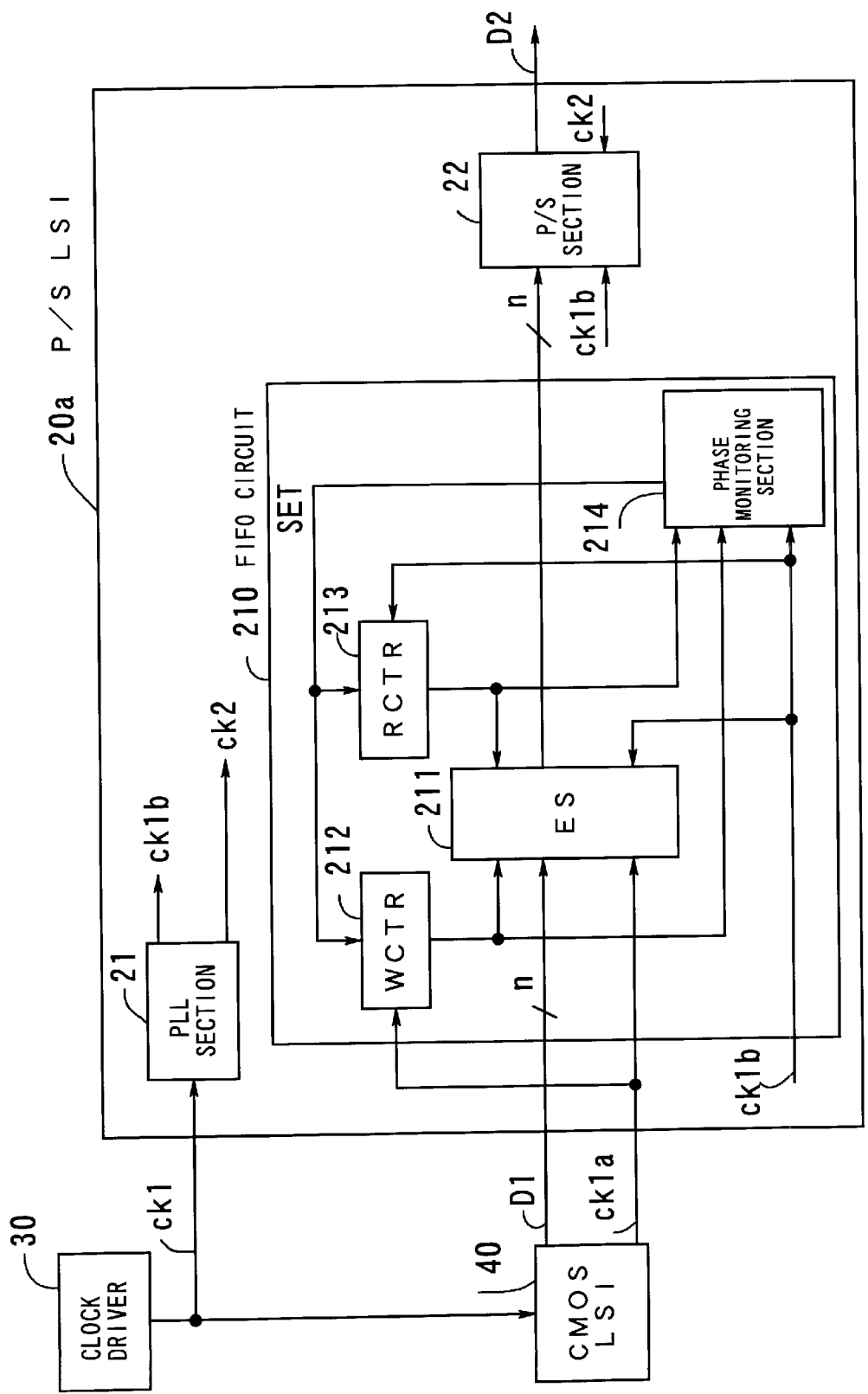
FIG. 11 is a diagram showing the configuration of another conventional P/S LSI including a FIFO circuit.
Figure 12:
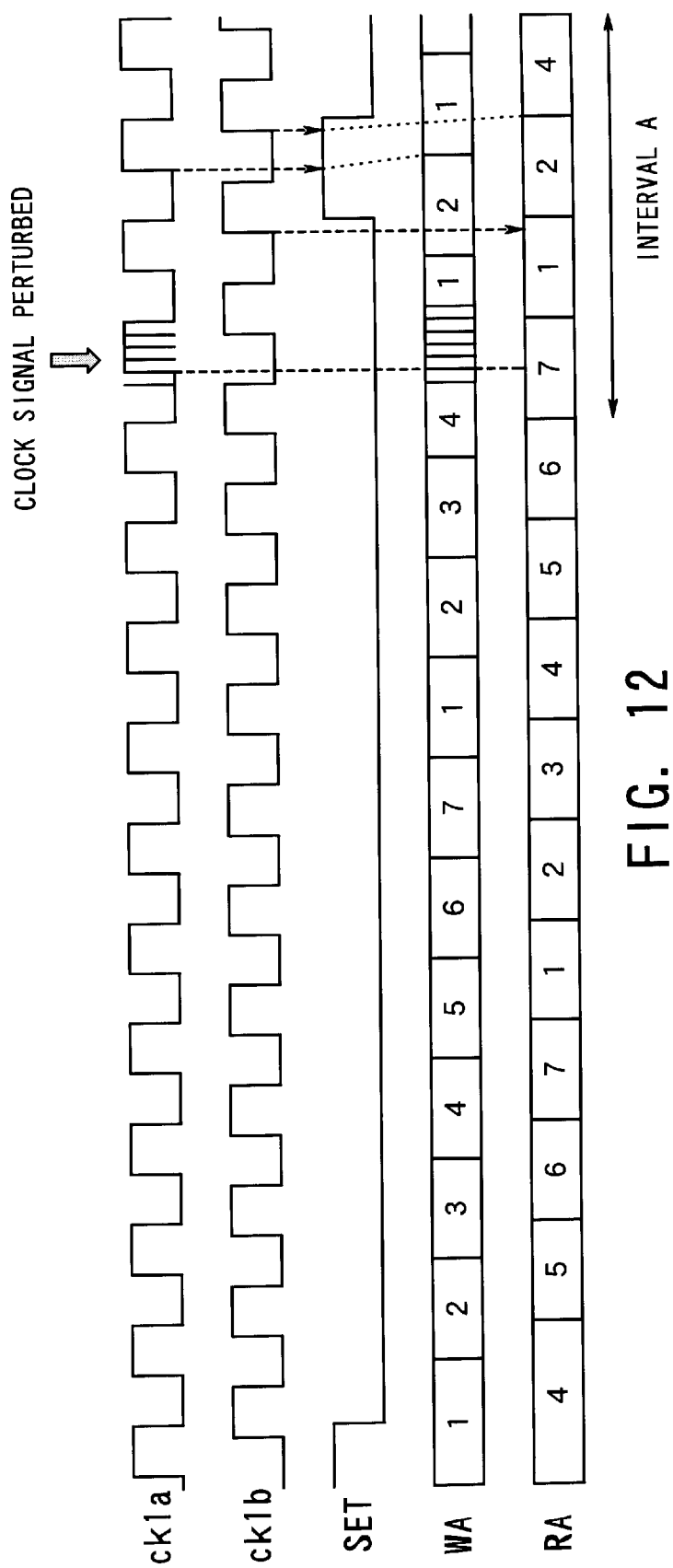
FIG. 12 is a time chart illustrating a resetting operation performed by the P/S LSI.
Figure 13:
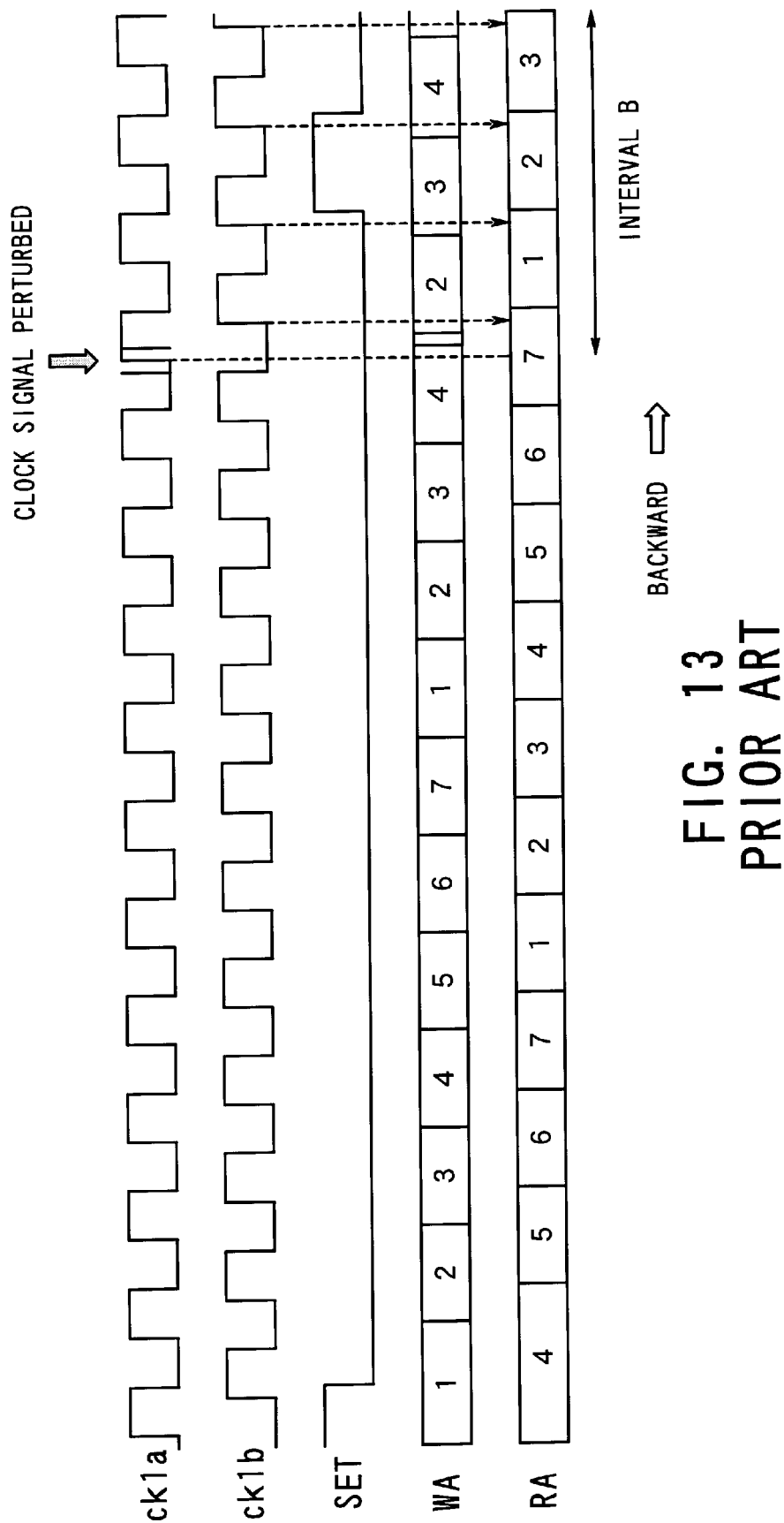
FIG. 13 is a time chart illustrating a problematic operation of the P/S LSI.

The P/S LSI 100 comprises a PLL circuit 101, a P/S circuit 102, and a FIFO circuit 110. The PLL circuit 101 and the P/S circuit 102 are similar in configuration to the PLL section 21 and the P/S section 22, respectively, explained above with reference to FIGS. 10 and 11. The FIFO circuit 110 has the function of the transmission device 10.

The FIFO circuit 110 will be described in more detail. In the following description, for the sake of clarity of functional operations, the FIFO circuit 110 will be described separately as a FIFO circuit 110-1 for monitoring a first phase state (phase state in which the consecutive count of an address value has become outside a set range) as the unstable phase state, and a FIFO circuit 110-2 for monitoring a second phase state (phase state in which a skip of address value count has occurred) as the unstable phase state (in practice the FIFO circuit 110 has both of these functions).

Figure 5:
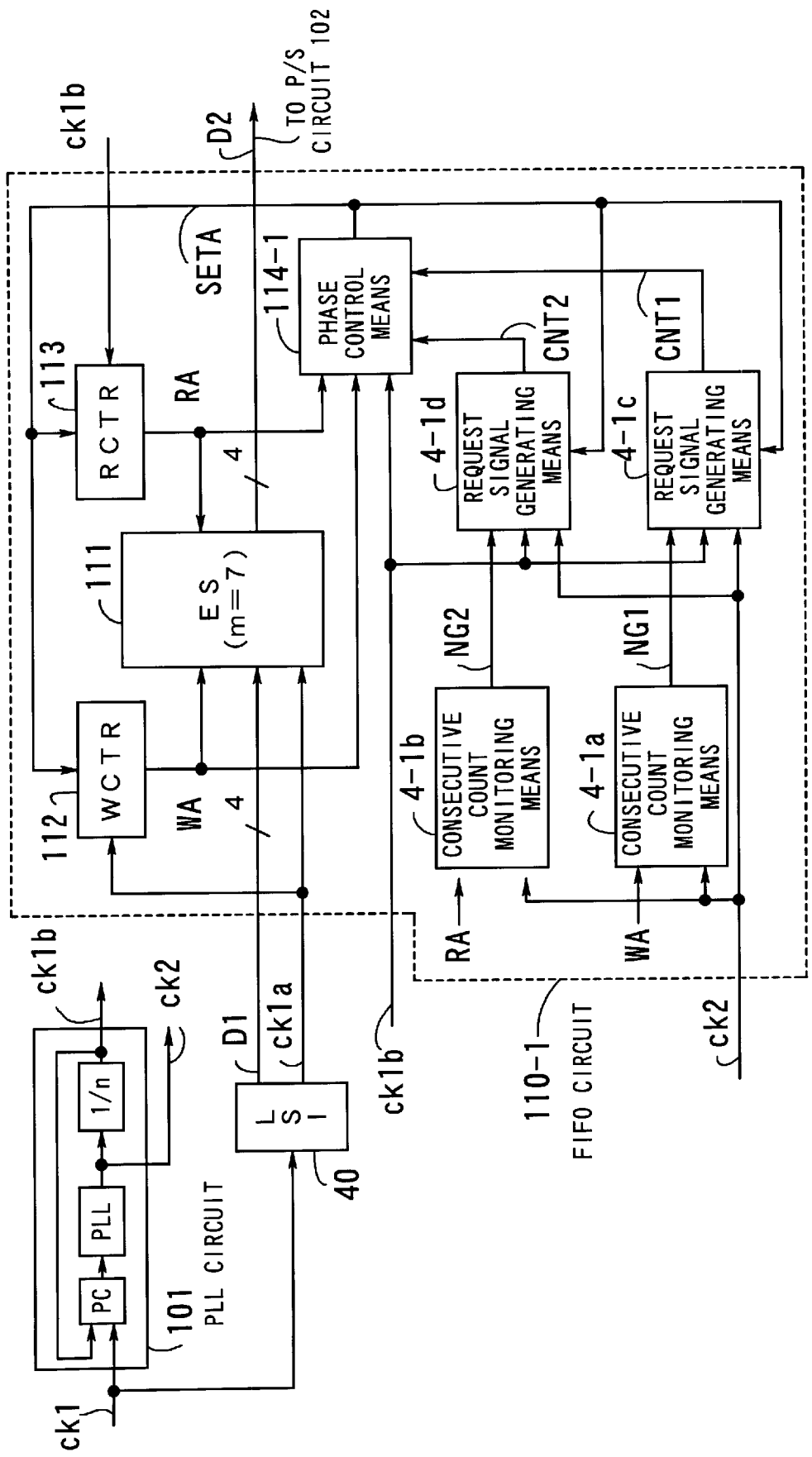
FIG. 5 is a diagram showing the configuration of a FIFO circuit.

FIG. 5 shows the configuration of the FIFO circuit 110-1. The FIFO circuit 110-1 comprises an elastic store memory (hereinafter ES) 111, a write counter 112, a read counter 113, phase control means 114-1, consecutive count monitoring means 4-1$a$ and 4-1$b$, and request signal generating means 4-1$c$ and 4-1$d$.

The clock signal ck1 is supplied to the PLL circuit 101 and the LSI 40. A clock signal ck2 is a signal obtained by multiplying the clock signal ck1 by n while keeping time with the clock signal ck1, and a clock signal ck1$b$ is a signal whose frequency is 1/n of that of the clock signal ck2. The LSI 40 outputs n-parallel data D1 and a clock signal ck1$a$ (obtained by delaying the clock signal ck1).

The clock signals ck1$a$ and ck1$b$ each have a frequency equal to 1/n of that of the clock signal ck2. Accordingly, where the count of the write counter 112, which performs counting in response to the clock signal ck1$a$, and the count of the read counter 113, which performs counting in response to the clock signal ck1$b$, are monitored at the frequency of the clock signal ck2, identical values are detected n times consecutively.

If, however, abnormality such as perturbation of the clock signal occurs due to an external factor, the number of times an identical value is detected consecutively, that is, a consecutive count, changes. Accordingly, the consecutive count is monitored all the time, and if the count becomes outside a preset range, the phase state is judged to have become unstable, followed by the resetting of the write and read counters 112 and 113.

In the following description, it is assumed that the number n of parallel data is "4" (n=4) and that the depth m of the ES 111 is "7" (m=7). Also, a normal range for the consecutive count is set to range from "n−1", to "n+1". Specifically, the set range is from "3" to "5", and if the consecutive count shows a value other than "3", "4" and "5", it is judged that the phase state has shifted to an unstable phase state. The set range of from "n−1" to "n+1", instead of the fixed value n, is used for the monitoring of the consecutive count in consideration of a situation where the consecutive count may possibly be monitored at a point of time close to a change of the count by means of the clock signal ck2, and for this reason, a width of ±1 bit is provided.

The consecutive count monitoring means 4-1$a$ monitors, by means of the clock signal ck2, a write address WA counted up by the write counter 112 in response to the clock signal ck1$a$, to determine how many times an identical value could be fetched. Since phase-unguaranteed data (clock signal ck2 and write address WA) is fetched, the consecutive count monitoring means 4-1$a$ performs control so as not to incur a metastable state (state in which the output signal becomes unstable because of irregular setup time or hold time).

The consecutive count monitoring means 4-1$b$ monitors, by means of the clock signal ck2, a read address RA counted up by the read counter 113 in response to the clock signal ck1$b$, to determine how many times an identical value could be fetched. Since phase-guaranteed data (clock signal ck2 and read address RA) is fetched, the consecutive count monitoring means 4-1$b$ need not perform control to prevent the occurrence of a metastable state.

The phase state is judged to be normal if the number of times an identical value could be fetched falls within the range of "3" to "5", and is judged to be abnormal if the number of times is outside the range. If abnormality is found in the write address WA, the consecutive count monitoring means 4-1$a$ outputs an abnormality detection signal NG1, and if abnormality is found in the read address RA, the consecutive count monitoring means 4-1$b$ outputs an abnormality detection signal NG2.

On receiving the abnormality detection signal NG1, the request signal generating means 4-1$c$ outputs a reset request signal CNT1 for resetting the write and read counters 112 and 113. On receiving the abnormality detection signal NG2, the request signal generating means 4-1$d$ outputs a reset request signal CNT2 for resetting the write and read counters 112 and 113.

Using the clock signal ck1$b$, the phase control means 114-1 monitors the phase state to detect a coincident phase state in which the write address WA coincides with the read address RA. If the coincident phase state is detected, the phase control means outputs a reset signal SETA for resetting the write and read counters 112 and 113. The phase control means outputs the reset signal SETA also when supplied with at least one of the reset request signals CNT1 and CNT2. Further, at the startup of the device, the reset signal SETA is output (as part of an initializing process).

The reset signal SETA is supplied also to the request signal generating means 4-1$c$ and 4-1$d$, and the reset request signals CNT1 and CNT2 are canceled by the reset signal SETA.

Figure 8:
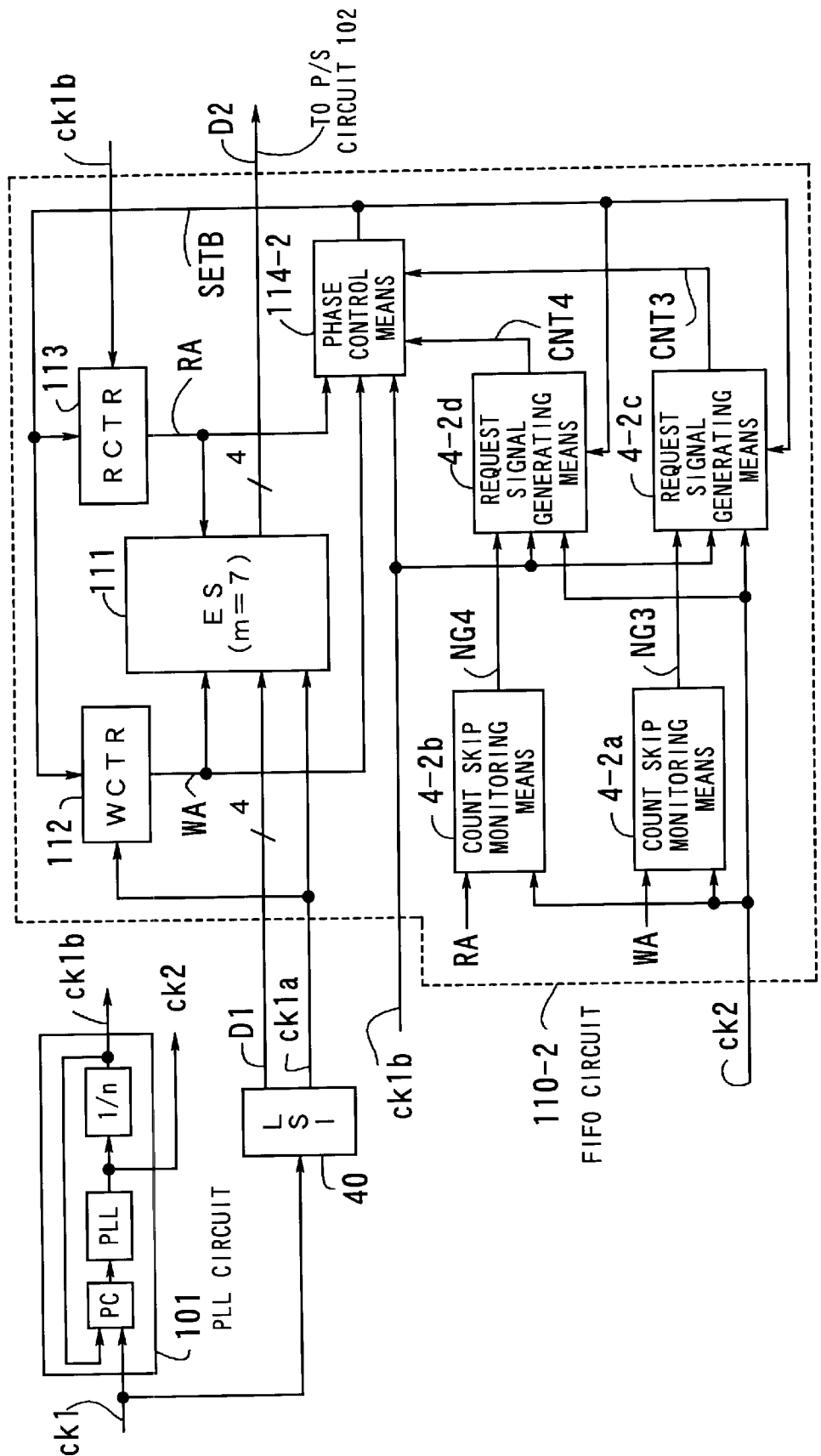
FIG. 8 is a diagram showing the configuration of the FIFO circuit.

Immediately after the startup of the device or the resetting, the duration of the write address WA value or the read address RA value may be prolonged or a count skip may occur (as described later with reference to FIG. 8 and the following figures). If the consecutive counts are monitored by the consecutive count monitoring means 4-1$a$ and 4-1$b$ during such a period, an erroneous monitoring result may be derived, though in actuality the phase state is steady. Accordingly, the abnormality detection signals NG1 and NG2 output immediately after the startup or the resetting are masked within the request signal generating means 4-1$c$ and 4-1$d$, so that the signals are ignored and not used for control. The consecutive count monitoring means 4-1$a$ and 4-1$b$ may be disabled instead.

Figure 6:
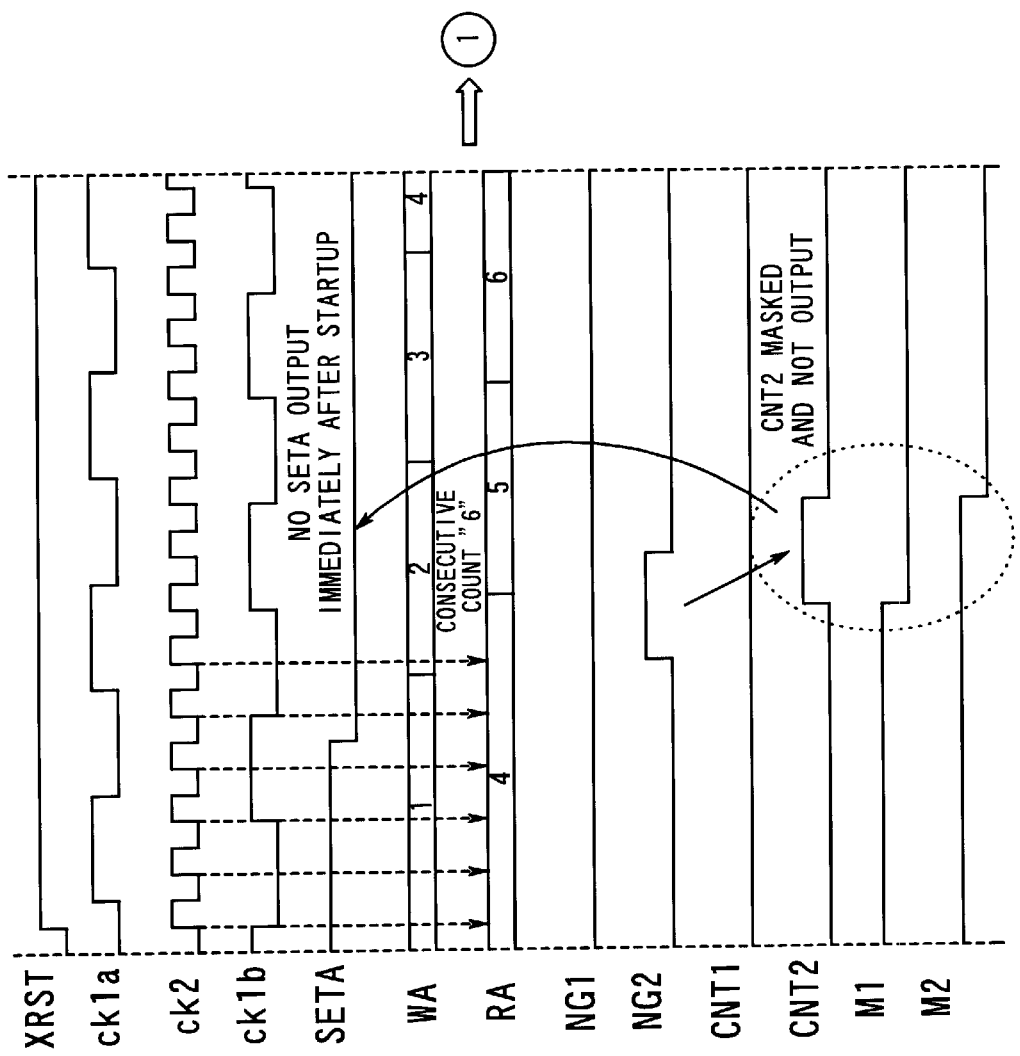
FIG. 6 is a timing chart illustrating a resetting operation performed in case of abnormality in consecutive count.
Figure 7:
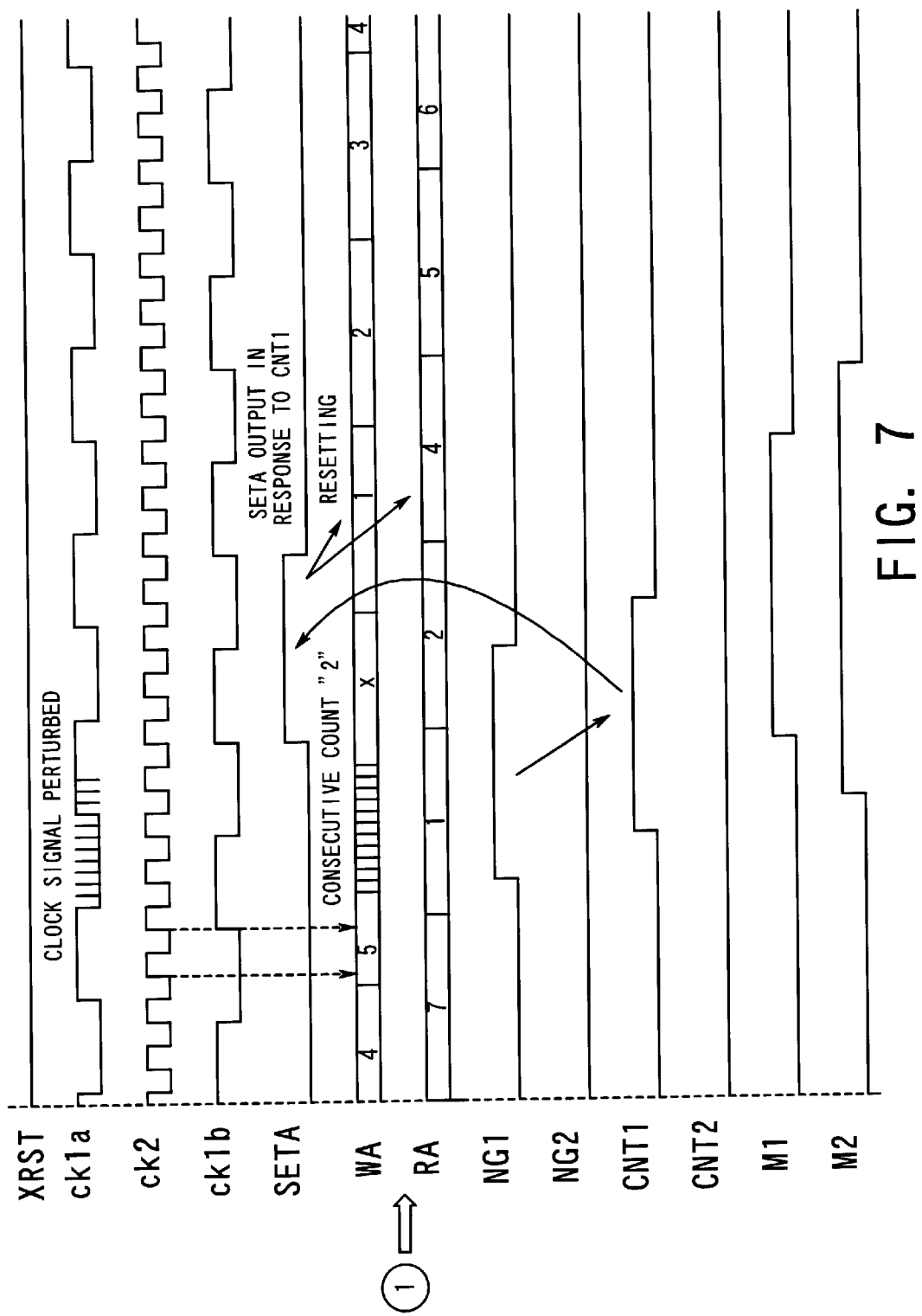
FIG. 7 is a timing chart also illustrating a resetting operation performed in case of abnormality in consecutive count.

The resetting operation performed in case of abnormality in the consecutive count will be now described with reference to the timing charts of FIGS. 6 and 7, wherein FIG. 6 illustrates the startup state and FIG. 7 illustrates the resetting operation performed as a result of perturbation of clock signal. The clock signals ck1$a$ and ck1$b$ each have a frequency equal to ¼ of that of the clock signal ck2, and have a phase relation as illustrated in the figures. After the startup in response to the resetting of XRST, the reset signal SETA is output, and the write and read counters 112 and 113 are initialized, whereupon the write counter 112 starts counting from "1" while the read counter 113 starts counting from "4" (initialization).

Immediately after the startup, the duration of the read address value "4" is prolonged as shown in FIG. 6. Accordingly, the consecutive count monitoring means 4-1$b$ judges that the consecutive count has become outside the set range of "3" to "5" as soon as it has counted the read address value "4" six times consecutively in response to the clock signal ck2, and thus outputs the abnormality detection signal NG2.

The request signal generating means 4-1$d$ should originally output the reset request signal CNT2 at timing shown in FIG. 6; however, since the device has just been started, the reset request signal CNT2 is masked by a mask signal M2 within the request signal generating means 4-1$d$ and, in actuality, is not output. Consequently, although the monitoring result immediately after the startup shows a consecutive count of "6", the reset signal SETA is not output.

On the other hand, in the case where perturbation of clock signal has occurred at the position shown in FIG. 7, the consecutive count monitoring means 4-1$a$ counts the write address value "5" only twice consecutively in response to the clock signal ck2. Since the consecutive count "2" is outside the set range of "3" to "5", the abnormality detection signal NG1 is output.

Accordingly, the request signal generating means 4-1$c$ outputs the reset request signal CNT1, and in response to the signal CNT1, the phase control means 114-1 outputs the reset signal SETA to the write and read counters 112 and 113.

When supplied with the reset signal SETA, the write and read counters 112 and 113 are reset to the original steady phase state and then start counting. In the case illustrated in FIG. 7, no masking is necessary immediately after the resetting, but the mask signals M1 and M2 are automatically output within the request signal generating means 4-1$c$ and 4-1$d$.

The FIFO circuit 110-2 for monitoring the second phase state will be now described. FIG. 8 shows the configuration of the FIFO circuit 110-2. The FIFO circuit 110-2 comprises the ES 111, the write counter 112, the read counter 113, phase control means 114-2, count skip monitoring means 4-2$a$ and 4-2$b$, and request signal generating means 4-2$c$ and 4-2$d$. In the following, identical reference numerals represent elements identical with those appearing in FIG. 5, and therefore, description of such elements is omitted.

In the FIFO circuit 110-2, the write address value and the read address value are monitored, and when a count skip has been detected (e.g., "7" comes after "5", thus skipping "6"), the write and read counters 112 and 113 are reset.

During normal operation, no count skip occurs, but if abnormality such as perturbation of clock signal occurs due to an external factor such as ESD, the counts may possibly become abnormal, making the phase state unstable, even though the aforementioned consecutive count condition is fulfilled. Accordingly, such a count skip is detected and the resetting is performed.

The count skip monitoring means 4-2$a$ monitors, by means of the clock signal ck2, the write address WA counted up by the write counter 112 in response to the clock signal ck1$a$, to determine whether or not a count skip has occurred, for example, "6" is skipped and "7" comes after "5". If a count skip has occurred in the write address WA, the count skip monitoring means 4-2$a$ outputs an abnormality detection signal NG3.

The count skip monitoring means 4-2$b$ monitors, by means of the clock signal ck2, the read address RA counted up by the read counter 113 in response to the clock signal ck1$b$, to detect a count skip. If a count skip has occurred in the read address RA, the count skip monitoring means 4-2$b$ outputs an abnormality detection signal NG4.

On receiving the abnormality detection signal NG3, the request signal generating means 4-2$c$ outputs a reset request signal CNT3 for resetting the write and read counters 112 and 113. Similarly, on receiving the abnormality detection signal NG4, the request signal generating means 4-2$d$ outputs a reset request signal CNT4 for resetting the write and read counters 112 and 113.

The phase control means 114-2 outputs a reset signal SETB when at least one of the reset request signals CNT3 and CNT4 has been received, and also when the coincident phase state has been detected. Further, during the initializing process at the startup of the device, the reset signal SETB is output.

The reset signal SETB is supplied also to the request signal generating means 4-2$c$ and 4-2$d$, so that the reset request signals CNT3 and CNT4 are canceled by the reset signal SETB.

Masking is also performed in like manner. Specifically, the abnormality detection signals NG3 and NG4 output immediately after the resetting are masked within the request signal generating means 4-2$c$ and 4-2$d$ and are not used for control so that a count skip caused due to the resetting may not be detected as an abnormal state.

The resetting operation performed in case of count skip abnormality will be now described with reference to the timing chart of FIG. 9.

Figure 9:
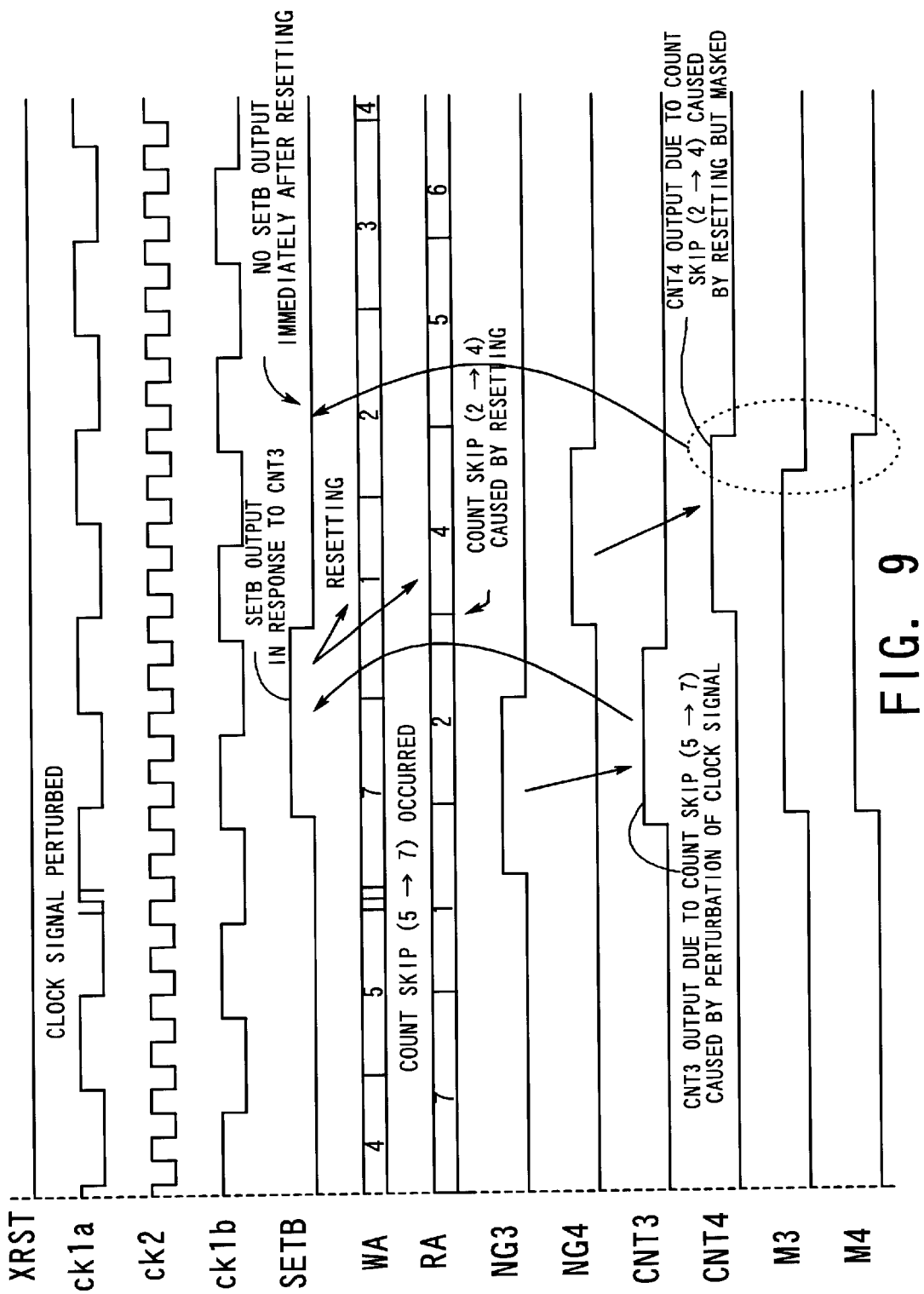
FIG. 9 is a timing chart illustrating a resetting operation performed in case of count skip abnormality.

In the case where perturbation of clock signal has occurred at the position shown in FIG. 9 due to an external factor, the count skip monitoring means 4-2$a$ detects a count skip (5→7) of the write address value by means of the clock signal ck2 and outputs the abnormality detection signal NG3.

On receiving the abnormality detection signal NG3, the request signal generating means 4-2$c$ outputs the reset request signal CNT3, and in response to the signal CNT3, the phase control means 114-2 outputs the reset signal SETB to the write and read counters 112 and 113. When supplied with the reset signal SETB, the write and read counters 112 and 113 are reset to their original steady phase state and then start counting.

If a count skip (2→4) of the read address value occurs due to the resetting, the count skip monitoring means 4-2$b$ outputs the abnormality detection signal NG4 in response to the clock signal ck2.

The request signal generating means 4-2$d$ should originally output the reset request signal CNT4 at the timing shown in FIG. 9; however, since the device has just been reset, the reset request signal CNT4 is masked by the mask signal M4 within the request signal generating means 4-2$d$ and is actually not output. Consequently, no reset signal SETB is output as a result of the count skip (2→4).

As described above, the transmission device 10 and the integrated circuit 100 according to the present invention are constructed such that when a transition from the steady phase state to either the coincident phase state in which the address values coincide with each other or the unstable phase state in which the phase fluctuation margin is one-sided is detected, the reset signal is output so as to bring the phase relation between the write and read addresses to an optimum phase relation.

It is therefore possible to prevent an unnecessary resetting from taking place during normal operation, thus improving the quality and reliability of digital transmission control.

In cases where the present invention is applied to a SONET transmission system, for example, the transmission device 10 or the integrated circuit 100 of the invention may be used as a signal processing section for subjecting a 16-parallel signal at STS-3c (155.52 Mbps) to high-speed interfacing to obtain an optical signal at a transmission rate of OC48c (2.488320 Gbps). Where the present invention is applied to such transmission systems, high-accuracy transmission control can be achieved.

As described above, in the transmission device according to the present invention, when a transition from the steady phase state in which writing/reading is normally performed to either the coincident phase state in which the address values coincide with each other or the unstable phase state in which the phase fluctuation margin is one-sided is detected, the reset signal is output so as to bring the phase relation between the write and read addresses to an optimum phase relation. Consequently, high-accuracy digital transmission control can be performed, making it possible to improve the quality and reliability.

Also, in the integrated circuit according to the present invention, when a transition from the steady phase state in which writing/reading is normally performed to either the coincident phase state in which the address values coincide with each other or the unstable phase state in which the phase fluctuation margin is one-sided is detected, the reset signal is output so as to bring the phase relation between the write and read addresses to an optimum phase relation. This makes it possible to perform high-accuracy bit-rate conversion control, thus improving the quality and reliability.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission device for controlling transmission of digital signals, comprising:
   a memory for storing an input signal;
   write address generating means for generating a write address for writing in said memory;
   read address generating means for generating a read address for reading from said memory;
   phase state monitoring means for monitoring a transition from a steady phase state in which writing/reading in/from said memory is normally performed or from a startup state to a coincident phase state in which address values of the write and read addresses coincide with each other or to an unstable phase state in which a phase fluctuation margin is one-sided; and
   reset signal output means, responsive to detection of the coincident phase state or the unstable phase state, for outputting a reset signal to said write address generating means and said read address generating means such that a phase relation between the write and read addresses is brought to an optimum phase relation.

2. The transmission device according to claim 1, wherein said phase state monitoring means detects, as the unstable phase state, a first phase state in which a consecutive count of an address value has become outside a set range, or a second phase state in which a skip of address value count has occurred.

3. The transmission device according to claim 1, wherein said reset signal output means masks the reset signal output in a state immediately after resetting including a state immediately after the startup.

4. An integrated circuit having a signal rate conversion function built therein and packaged on a semiconductor substrate, comprising:
   a PLL circuit for generating an output clock signal by multiplying an input clock signal, which is synchronized with an n-parallel signal, by n while keeping time with the input clock signal;
   a FIFO circuit including a memory for storing the parallel signal, write address generating means for generating a write address for writing in the memory, read address generating means for generating a read address for reading from the memory, phase state monitoring means for monitoring a transition from a steady phase state in which writing/reading in/from the memory is normally performed or from a startup state to a coincident phase state in which address values of the write and read addresses coincide with each other or to an unstable phase state in which a phase fluctuation margin is one-sided, and reset signal output means, responsive to detection of the coincident phase state or the unstable phase state, for outputting a reset signal to the write address generating means and the read address generating means such that a phase relation between the write and read addresses is brought to an optimum phase relation; and
   a P/S circuit for converting the parallel signal read out from the memory to a serial signal in response to the output clock signal.

5. The integrated circuit according to claim 4, wherein said phase state monitoring means detects, as the unstable phase state, a first phase state in which a consecutive count of an address value has become outside a set range, or a second phase state in which a skip of address value count has occurred.

6. The integrated circuit according to claim 4, wherein said reset signal output means masks the reset signal output in a state immediately after resetting including a state immediately after the startup.

* * * * *